Oct. 26, 1926.
S. G. BRAUN
1,604,217
MULTIPLE CONVEYER PRESS
Filed Feb. 6, 1925
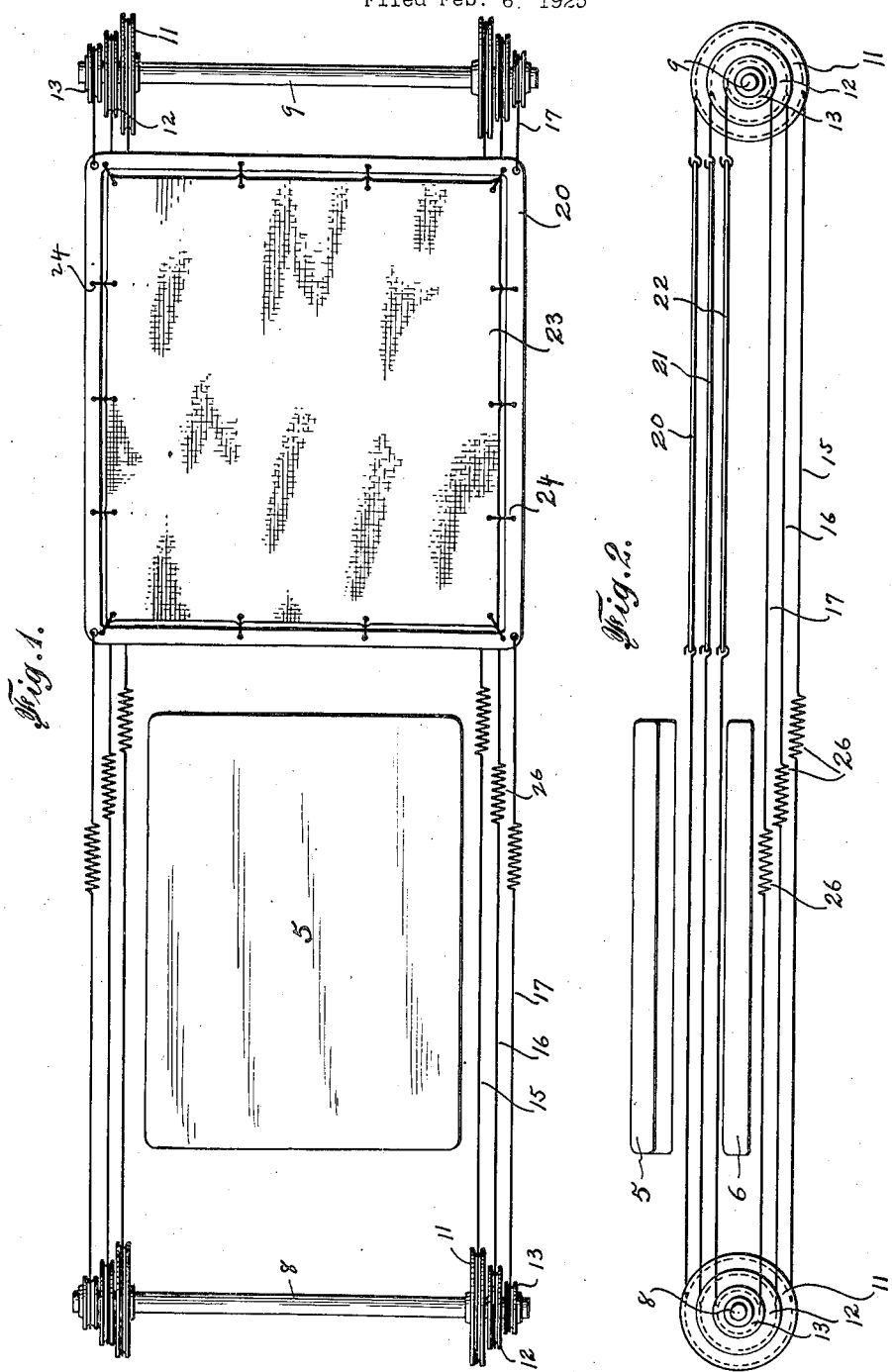
INVENTOR
*Samuel G. Braun*
BY
*Bonner + Ledbetter*
ATTORNEYS Patented Oct. 26, 1926.

1,604,217

UNITED STATES PATENT OFFICE.

SAMUEL G. BRAUN, OF NEW YORK, N. Y., ASSIGNOR, BY MESNE ASSIGNMENTS, TO LIBERTY NATIONAL BANK, TRUSTEE, OF SYRACUSE, NEW YORK.

MULTIPLE-CONVEYER PRESS.

Application filed February 6, 1925. Serial No. 7,256.

This invention relates to pressing machines and particularly to improvements in garment pressing machines having conveyer means associated therewith. More especially the invention relates to a novel multiple conveyer press.

An object of the invention is to produce a pressing machine and a multiple conveyer working in conjunction therewith for the purpose of pressing and curing pleated goods and the like where it is desirable to press several layers of goods together and yet at the same time separate the goods by providing separate and individual supporting means for each layer of silk material, pleated goods or other work which is to be pressed; and a further object is to multiply the capacity of a pressing machine to turn out permanently pleated goods.

The accompanying drawings are in diagrammatic form and are presented to disclose the principle of structure and mode of operation; and it is understood how changes may be made for the purpose of better adapting the novel multiple conveyer to ordinary pressing machines.

Figure 1 illustrates a plan view of the multiple conveyer press with the pressing head removable therefrom to show the working face of the buck together with a plan view of the conveyers; and Figure 2 shows a front view of the pressing head and buck with the multiple conveyers combined therewith.

Referring further to the drawings for a detailed description of the invention, there is shown diagrammatic press jaws comprising for example a head 5 and a buck 6, and it is understood how any suitable form of pressing machine with opening and closing jaws may be used in connection with this multiple conveyer structure. The jaws are suitably heated for treating the work and in many instances the pressing machine 5—6 is equipped with steam spraying means, or air blowing and evacuating means, as well as ofttimes being equipped with sterilizing features, but such facilities are omitted for the purpose of more aptly confining the description to the multiple conveyers as used with any suitable form of pressing machine.

A pair of shafts 8 and 9 are spaced apart with the pressing machine 5—6 arranged therebetween, and sometimes it is preferable to place one shaft 8 closer to the pressing machine than the other shaft which disposes the conveyer shaft 9 a distance from the pressing machine somewhat greater than the length of a conveyer tray, though it is within the scope of this invention to place the pressing machine 5—6 centrally between the shafts 8 and 9 in order that the trays may move from one side of the press all the way therethrough and be ejected from the press on the other side thereof.

A plurality of grooved pulleys 11, 12 and 13 are mounted on the shafts 8 and 9. In the present instance, I have illustrated four sets of grooved pulleys arranged in units of three because, for the present illustration I have chosen to describe three conveyer trays, though it is understood how a greater or less number may be used. A series of cables 15, 16 and 17 are carried on the respective pulleys 11, 12 and 13. The pulleys are preferably graduated in diameter just enough to space the several cables apart to give clearance in operation. The cables may be endless or they may be broken with the trays included in series therewith as shown in the drawings.

A plurality of trays 20, 21 and 22 are either carried on the endless cables, or inserted therein as by opening the cable and making the tray structure a part thereof. The trays are comparatively light in weight and each comprise a rectangular shaped frame 20, 21 or 22 as shown together with a cloth or wire gauze center piece 23 stretched within the frame by lacings or other suitable fastening means 24.

A spring 26 is usually inserted in series within each cable to place the cable under permanent tension to automatically take up the slack should the cables have a tendency to stretch or give. Furthermore, these springs 26 are inserted in the cable lines for the purpose of permitting the cables to stretch when the press jaws 5 and 6 move together against the work when all the trays are rolled thereinbetween.

In the operation of the machine, the operator usually loads the top tray first whereupon it is rolled or pushed into the jaws 5—6. This exposes or uncovers the next tray 21 upon which the operator spreads the work, and similarly this tray is moved into the press as well as the next tray and each successive tray thereunderneath after they are loaded with work. After the several trays 20, 21 and 22 are moved into the press jaws, the press is caused to close upon the work held by the tray centers 23 and the springs 26 permit the trays to be moved into the jaw pressing plane. Ordinarily, the press remains closed for a long period because this special type of conveyer machine is designed for long period pressing operations where the work must be cured or baked such as permanently baking in pleats in silks or other goods.

The press is next caused to be opened whereupon the springs 26 stretch the cable back to normal position thereby raising the trays off of the buck 6 which permits the operator to first move the bottom tray 22 outwardly whereupon the work is removed therefrom. Next the operator rolls the next bottom tray 21 out of the press for removal of the work and each successive upper tray is moved away from the press to have its baked and cured pleated silk or other goods unloaded and new work spread thereupon.

A special advantage in this type of multiple conveyer press resides in the fact that certain classes of work require a long baking and pressing duration and during this period much time is lost waiting to insert more work in the press and so it is wasteful of time when it is considered that only one piece of goods is being cured. In my improvements, it is possible to simultaneously bake and cure a plurality of pieces, thereby increasing the capacity of the pressing machine by an amount equal to the number of trays employed. For example, I have illustrated a triple conveyer pressing machine and in such case production in this machine is three times as fast as ordinary presses.

As further illustrating the principle of my invention, it may be observed that the trays constitute what might be termed the lower pressing member, that is the buck 6, and a plurality of such buck members are in fact brought into existence by employing a plurality of trays for the trays support the work as originally the buck did and so rather than spread the work on the buck 6, only one buck being available, the operator spreads work on all the trays and then closes the press on the several pieces of work whereby one pressing operation completes several pieces of goods rather than one piece as ordinarily done by old methods now in use.

What I claim is:—

1. A multiple conveyer press comprising in combination, pressing jaws between which the work is treated, a plurality of independently movable conveyer work carriers adapted to be moved in and out of the pressing jaws for simultaneously pressing the work on the carriers, and supporting means on which each carrier is mounted.

2. A multiple conveyer press comprising in combination, pressing jaws between which the work is treated, a plurality of separately moving cables arranged in pairs and disposed alongside the jaws, a work carrier tray carried by each pair of cables with one tray disposed above the other whereby the work is separately handled on each tray and all the trays of which are adapted to be simultaneously pressed.

3. A multiple conveyer press comprising in combination, pressing jaws between which the work is treated, a plurality of tray support members disposed alongside the jaws, a work carrier tray mounted on each support, and means by which each support member is spaced in parallel relation to the other thereby disposing said trays successively one above the other with clearance space therebetween.

4. A pressing machine comprising in combination, a plurality of parallel supports, a work carrier on each support, pressing jaws placed in alignment with the supports, and all the work carriers being capable of being moved into the jaws before the pressing operation begins whereby all the carriers are pressed at one time.

5. A pressing machine comprising in combination, a plurality of parallel supports, a work carrier on each support, pressing jaws placed in alignment with the supports, all the work carriers being capable of being moved into the jaws before the pressing operation begins whereby all the carriers are moved into alignment within the pressing jaws with one carrier successively stacked in spaced relation above the other, and means permitting the said successively spaced carriers to be depressed downwardly against the face of a pressing jaw.

6. A pressing machine comprising in combination, a plurality of parallel supports, a work carrier on each support, pressing jaws placed in alignment with the supports, all the work carriers being capable of being moved into the jaws before the pressing operation begins whereby all the carriers are moved into alignment within the pressing jaws with one carrier successively stacked in spaced relation above the other, and springs cooperating with the parallel supports adapting said supports to be moved by the closing press until the trays are moved into pressing position.

7. A conveyer pressing machine comprising in combination cooperating press jaws, cables adapted to move alongside the jaws, a tray secured to each cable, rollers graduated in size to space one cable and tray above the other, and each cable movable independently of the other whereby the trays may be successively moved into the press jaws at intervals until all trays are in the press at the same time to undergo one simultaneous pressing operation.

8. A conveyer pressing machine comprising in combination cooperating press jaws, cables adapted to move alongside the jaws, a tray secured to each cable, rollers graduated in size to space one cable and tray above the other, each cable movable independently of the other, whereby the trays may be successively moved into the press jaws at intervals until all trays are in the press at the same time to undergo one simultaneous pressing operation, and means cooperating with the cables permitting the trays to be moved into the pressing jaw plane.

9. A conveyer pressing machine comprising in combination cooperating press jaws, cables adapted to move alongside the jaws, a tray secured to each cable, rollers graduated in size to space one cable and tray above the other, each cable movable independently of the other whereby the trays may be successively moved into the press jaws at intervals until all trays are in the press at the same time to undergo one simultaneous pressing operation, and a spring included in each cable to permit said cable to give during the pressing operation and return to normal position at the end of the pressing operation.

In testimony whereof I affix my signature.

SAMUEL G. BRAUN.